US012567712B2

(12) United States Patent
Légaré et al.

(10) Patent No.: US 12,567,712 B2
(45) Date of Patent: Mar. 3, 2026

(54) ULTRAFAST LASER SOURCES AND METHOD

(71) Applicant: INSTITUT NATIONAL DE LA RECHERCHE SCIENTIFIQUE, Québec (CA)

(72) Inventors: François Légaré, Saint-Eustache (CA); Reza Safaei Mohammadabadi, Gatineau (CA); Guangyu Fan, Longueuil (CA)

(73) Assignee: INSTITUT NATIONAL DE LA RECHERCHE SCIENTIFIQUE, Québec (CA)

( * ) Notice: Subject to any disclaimer, the term of this patent is extended or adjusted under 35 U.S.C. 154(b) by 606 days.

(21) Appl. No.: 18/000,545

(22) PCT Filed: Jun. 7, 2021

(86) PCT No.: PCT/CA2021/050780
§ 371 (c)(1),
(2) Date: Dec. 2, 2022

(87) PCT Pub. No.: WO2021/248234
PCT Pub. Date: Dec. 16, 2021

(65) Prior Publication Data

US 2023/0261429 A1 Aug. 17, 2023

Related U.S. Application Data

(60) Provisional application No. 63/036,951, filed on Jun. 9, 2020.

(51) Int. Cl.
*H01S 3/10* (2006.01)
*G02B 6/02* (2006.01)
(Continued)

(52) U.S. Cl.
CPC ........ *H01S 3/0057* (2013.01); *G02B 6/02328* (2013.01); *H01S 3/0092* (2013.01);
(Continued)

(58) Field of Classification Search
CPC ................ H01S 3/0057; H01S 3/0092; H01S 3/094046; H01S 3/108; H01S 3/1086; H01S 3/30
See application file for complete search history.

(56) References Cited

U.S. PATENT DOCUMENTS 5,818,630 A 10/1998 Fermann et al.
7,349,452 B2 * 3/2008 Brennan, III ...... G02B 6/02357 372/30

(Continued)

FOREIGN PATENT DOCUMENTS

EP 1364433 11/2005

OTHER PUBLICATIONS

International search report and Written Opinion issued in parent PCT application No. PCT/CA2021/050780 dated Aug. 25, 2021.

(Continued)

*Primary Examiner* — Kinam Park
(74) *Attorney, Agent, or Firm* — Gwendoline Bruneau; Lavery, de Billy, L.L.P.

(57) ABSTRACT

There is provided an ultrafast laser source and a method for fabrication thereof, the system comprising a waveguide module and a compression module, wherein the waveguide module generates pulses of multidimensional solitary states from ultra-short-laser pulses and the compression module compresses the pulses of multidimensional solitary states at the output of the waveguide module, the method comprising generating pulses of multidimensional solitary states from ultrashort laser pulses; and compressing the pulses of multidimensional solitary states.

18 Claims, 7 Drawing Sheets

(51) Int. Cl.

| | |
|---|---|
| ***H01S 3/00*** | (2006.01) |
| ***H01S 3/094*** | (2006.01) |
| ***H01S 3/108*** | (2006.01) |
| ***H01S 3/30*** | (2006.01) |

(52) U.S. Cl.

CPC ........ *H01S 3/094046* (2013.01); *H01S 3/108* (2013.01); *H01S 3/1086* (2013.01); *H01S 3/30* (2013.01)

(56) References Cited

U.S. PATENT DOCUMENTS

| | | | | |
|---|---|---|---|---|
| 7,813,387 | B2 | 10/2010 | Pederden et al. | |
| 8,284,478 | B2 * | 10/2012 | Tempea | H01S 3/0057 359/332 |
| 8,554,035 | B2 | 10/2013 | Xu et al. | |
| 8,861,421 | B2 | 10/2014 | Shuster et al. | |
| 9,160,137 | B1 * | 10/2015 | Abdolvand | H01S 3/0092 |
| 9,645,470 | B2 * | 5/2017 | Liu | G02F 1/3558 |
| 11,209,717 | B2 * | 12/2021 | Backus | G02F 1/395 |
| 11,289,870 | B2 * | 3/2022 | Piccoli | G02F 1/35 |
| 2004/0240037 | A1 | 12/2004 | Harter | |
| 2006/0126679 | A1 * | 6/2006 | Brennan, III | G02B 6/02371 372/30 |
| 2007/0041083 | A1 * | 2/2007 | Di Teodoro | H01S 3/06708 359/333 |
| 2007/0104431 | A1 * | 5/2007 | Di Teodoro | H01S 3/06754 385/123 |
| 2009/0010287 | A1 * | 1/2009 | Liu | H01S 3/0064 372/6 |
| 2014/0334763 | A1 * | 11/2014 | Holzer | G02F 1/3513 385/1 |
| 2015/0192732 | A1 | 7/2015 | Moselund | |
| 2015/0357784 | A1 * | 12/2015 | Mironov | G02F 1/35 359/326 |
| 2016/0124144 | A1 * | 5/2016 | Benabid | B29D 11/00663 385/125 |
| 2019/0229487 | A1 | 7/2019 | Wise et al. | |

OTHER PUBLICATIONS

Brabec et al., Intense few-cycle laser fields: Frontiers of nonlinear optics, Rev. Mod. Phys. 72, 545 (2000).
Cerullo et al., Ultrafast optical parametric amplifiers, Rev. Sci. Instrum. 74, 1 (2003).
Chen, Z., Segev, M. & Christodoulides, D. N. Optical spatial solitons: historical overview and recent advances. Rep. Prog. Phys. 75, 086401 (2012).
Chen, B.-H. et al. Compression of picosecond pulses from a thin-disk laser to 30fs at 4W average power. Optics express 26, 3861-3869 (2018).
Corkum, P. B. Plasma perspective on strong field multiphoton ionization. Phys. Rev. Lett. 71, 1994 (1993).
Eftekhar, M. et al. Accelerated nonlinear interactions in graded-index multimode fibers. Nat. Com 10, 1-10 (2019).
Fan, G. et al. Hollow-core-waveguide compression of multi-millijoule CEP-stable 3.2 μm pulses. Optica 3, 1308-1311 (2016).
Fibich, G. & Gaeta, A. L. Critical power for self-focusing in bulk media and in hollow waveguides. Opt. Lett. 25, 335-337 (2000).
C. Fischer et al., in Solid-State Mid-Infrared Laser Sources (Springer, 2003), pp. 99-143.
Goulielmakis, E. et al. Single-cycle nonlinear optics. Science 320, 1614-1617 (2008).
Grelu, P. & Akhmediev, N. Dissipative solitons for mode-locked lasers. Nat. Photon. 6, 84 (2012).
Horak, P. & Poletti, F. Multimode nonlinear fibre optics: theory and applications. Recent Progress in Optical Fiber Research, 3-25 (2012.
Kartashov, Y. V., Astrakharchik, G. E., Malomed, B. A. & Torner, L. Frontiers in multidimensional self-trapping of honlinear fields and matter. Nature Reviews Physics 1, 185-197 (2019).
Kivshar, Y. S. & Agrawal, G. Optical solitons: from fibers to photonic crystals. (Academic press, 2003).
Klas, R., Eschen, W., Kirsche, A., Rothhardt, J. & Limpert, J. Generation of coherent broadband high photon flux continua in the XUV with a sub-two-cycle fiber laser. Optics Express 28, 6188-6196 (2020).
Knight, P. & Miller, A. Optical solitons: theory and experiment. vol. 10 (Cambridge University Press, 1992).
Knorr et al., Opt. Lett. 42, 4367 (2017.
Krupa et al., Multimode nonlinear fiber optics, a spatiotemporal avenue, APL Photonics 4 (2019).
Malomed, B. A., Mihalache, D., Wise, F. & Torner, L. Spatiotemporal optical solitons. Journal of Optics B: Quantum and Semiclassical Optics 7, R53 (2005).
Malomed, B., Torner Sabata, L., Wise, F. & Mihalache, D. On multidimensional solitons and their legacy in contemporary atomic, molecular and optical physics. J. Phys. B: At. Mol. Opt. Phys. 49, 170502 (2016).
Marcatili, E. A. & Schmeltzer, R. Hollow metallic and dielectric waveguides for long distance optical transmission and lasers. Bcl] Syst. Tech. J. 43, 1783-1809 (1964).
Mitschke, F. M. & Mollenauer, L. F. Discovery of the soliton self-frequency shift. Opt. Lett. 11, 659-661 (1986).
Nagy et al., Optimal pulse compression in long hollow fibers, Opt. Lett. 36, 4422 (2011).
Nisoli, M., De Silvestri, S. & Svelto, O. Generation of high energy 10 fs pulses by a new pulse compression technique. Appl. Phys. Lett. 68, 2793-2795 (1996).
Pourbeyram, H., Agrawal, G. P. & Mafi, A. Stimulated Raman scattering cascade spanning the wavelength range of 523 to 1750 nm using a graded-index multimode optical fiber. Appl. Phys. Lett. 102, 201107 (2013).
Rishøj, L., Tai, B., Kristensen, P. & Ramachandran, S. Soliton self-mode conversion: revisiting Raman scattering of ultrashort pulses. Optica 6, 304-308 (2019).
Russell, P. S. J., Hölzer, P., Chang, W., Abdolvand, A. & Travers, J. Hollow-core photonic crystal fibres for gas-based nonlinear optics. Nat. Photon. 8, 278 (2014).
Safaei et al., Low energy pulse compression in hollow core fibers using hydrofluorocarbon molecular gas, OSA Contin. 2, 1488 (2019).
Stegeman, G. I. & Segev, M. Optical spatial solitons and their interactions: universality and diversity. Science 286, 1518-1523 (1999).
Tani, F., Travers, J. C. & Russell, P. S. J. Multimode ultrafast nonlinear optics in optical waveguides: numerical modeling and experiments in kagomé photonic-crystal fiber. JOSA B 31, 311-320 (2014).
Tempea et al., Theory of self-focusing in a hollow waveguide, Opt. Lett. 23, 762 (1998).
Trabold, B., Abdolvand, A., Euser, T., Walser, A. & Russell, P. S. J. Amplification of higher-order modes by stimulated Raman scattering in H 2-filled hollow-core photonic crystal fiber. Opt. Lett. 38, 600-602 (2013).
Travers, J. C., Grigorova, T. F., Brahms, C. & Belli, F. High-energy pulse self-compression and ultraviolet generation through soliton dynamics in hollow capillary fibres. Nat. Photon. 13, 547-554 (2019).
Vozzi et al., Optimal spectral broadening in hollow-fiber compressor systems, Appl. Phys. B 80, 285 (2005).
Wright, L. G., Christodoulides, D. N. & Wise, F. W. Controllable spatiotemporal nonlinear effects in multimode fibres. Nat. Photon. 9, 306-310 (2015).
Wright, L. G., Renninger, W. H., Christodoulides, D. N. & Wise, F. W. Spatiotemporal dynamics of multimode optical solitons. Optics express 23, 3492-3506 (2015).
Wright, L. G. et al. Self-organized instability in graded-index multimode fibres. Nat. Photon. 10, 771 (2016).
Wright, L. G., Christodoulides, D. N. & Wise, F. W. Spatiotemporal mode-locking in multimode fiber lasers. Science 358, 94-97 (2017).
Wright, L. G. et al. Mechanisms of spatiotemporal mode-locking. Nature Physics, 1-6 (2020).

(56) References Cited

OTHER PUBLICATIONS

European Extended Search Report issued in parent EP application No. 21820928.6—Jun. 14, 2024.
Piccoli et al., Ultrafast phenomena in hollow-core fibres, Photonic North (PN), IEEE, May 26, 2020.
Travers et al., Soliton Self-Compression in Hollow Capillary Fibrers, Conference on Lasers and Electro-Optics & European QUantum Eletronics Conference, Jun. 23, 2019.

* cited by examiner

ULTRAFAST LASER SOURCES AND METHOD

CROSS-REFERENCE TO RELATED APPLICATIONS

This application is a National Entry Application of PCT application no PCT/CA2021/050780 filed on Jun. 7, 2021, and published in English under PCT Article 21(2), which itself claims benefit of U.S. provisional application Ser. No. 63/036,951, filed on Jun. 9, 2020. All documents above are incorporated herein in their entirety by reference.

FIELD OF THE INVENTION

The present invention relates to ultrafast laser sources and method of fabrication thereof.

BACKGROUND OF THE INVENTION

An increasing number of applications, such as table top coherent X-ray sources via high-harmonic generation (HHG), compact laser Wakefield accelerator, laser-induced electron diffraction, high-field terahertz (THz) generation and remote sensing for example, call for the development of novel ultrafast laser driver sources. Besides potential applications for fundamental research, ultrafast laser technology has opened up new avenues for a range of applications in a number of fields including electronics, medical, automotive, research, aerospace or security and defense for example. Ultrashort pulses with extremely high peak intensities are well adapted to the high-quality microfabrication of soft/hard materials for instance. Raman spectroscopy and microscopy use laser sources at a selected wavelength to identify the chemical compounds of unknown samples and to enable diverse applications such as tumor detection, drug delivery studies, and biofuel process monitoring. Thus, there is a continuously growing interest in developing cost-efficient, high-energy, tunable, and broadband ultrashort laser sources, for a range of applications in a range of fields.

Common laser gain media are based on Ti, Yb, Nd, Cr, Er, and Tm ions and generate pulses at specific wavelengths 800 nm, 1030 nm, 1064 nm, 1350 nm, 1500 nm, and 2000 nm, respectively. The operating wavelength of these lasers is fixed, and their gain medium exhibits on the downside a somewhat limited bandwidth, which prohibits the direct generation of few-cycle laser pulses. Some degree of wavelength tunability may be achieved based on optical parametric amplification (OPA) in non-centrosymmetric nonlinear crystals for frequency down-conversion or harmonic generation (second-harmonic generation (SHG), third harmonic generation (THG)). Although in typical femtosecond optical parametric amplification (OPA) systems the energy conversion efficiency from the pump to the frequency-down-converted wave may reach nearly 20%, optical parametric amplification (OPA) systems are fundamentally limited in terms of transparency of the nonlinear crystal, phase-matching condition, and precise temporal synchronization, which set strict boundaries to the range, and require very specific skills to install and maintain. Furthermore, optical parametric amplification (OPA) systems often require multiple stages, are lossy, bulky, expensive and complex, with impair beam quality, and deliver pulse durations comparable to the pulse durations of the pumping laser system.

Extreme short pulse generation relies on external nonlinear pulse compression. Recently, stretched flexible hollow fibers were used for compression of a few hundred femtosecond pulses to sub 30 fs pulses. However, cascaded hollow core fibers (HCF) arrangements or multiple meters long hollow core fibers (HCF) are needed to compress sub-300 fs pulses to few-cycle pulse duration, thereby increasing the complexity and inefficiency of the systems. For example, coupling the compressed pulses into the second hollow core fiber (HCF) in two compression stages remains challenging since the peak power is higher after the first hollow core fiber (HCF), which seriously limits the ability to compress high energy pulses.

Spatiotemporal nonlinear dynamics in multimode systems studied in the past few years have important implications for light sources that have higher power, broader bandwidth and greater tunability than single-mode solid core based laser sources. The manipulation of the temporal and spectral properties of ultrashort pulses combined with solid-core fiber multimodality has provided a great degree of controllability for laser systems. Efficient spatiotemporal dynamics in multimode fibers have only been observed in solid-core fibers so far. The high efficiency of these dynamics is based on the inhomogeneity of the refractive-index landscape in graded-index (GRIN) fiber, which provides low modal dispersion. Low modal dispersion through nonlinear propagation in multimode fibers is a key requirement for efficient spatiotemporal dynamics. However, solid core multimode fibers restrict the maximum peak power due to their low optical damage threshold, and they typically work at nJ level of energy per pulse. Moreover, the nonlinearity and dispersion of solid core multimode fibers are fixed by the core of the fibers, and the transparency window of solid core multimode fibers is limited. For example, for wavelength above 1800 nm, the multiphonon absorption leads to steeply rising absorption or infrared absorption edge in silica fibers.

Optical parametric amplification (OPA) in non-centrosymmetric material is the current state of art in search of wavelength tunability. The wavelength tunability for energetic, broadband pulses still relies on optical parametric amplification (OPA) systems. Their broad tuning range results from using nonlinear optics to split pump photons into a pair of longer-wavelength photons, namely the signal and the idler, which add to equal the pump frequency. Adding optics for sum-frequency and second-harmonic generation may extend the tuning range to reach into the ultraviolet, spanning-200 nm to 3300 nm. By using the transparency properties of nonoxide nonlinear crystals, which provide an extended transparency window, optical parametric amplification (OPA) systems with longer wavelength emission have been realized in the mid-IR wavelength range between 3000 nm and 20000 nm.

Another method uses extremely short pulses. The pulses require ultra-broadband spectra. Spectral broadening and supercontinuum generation in nonlinear fibers, waveguides, and crystals are common to generate broadband light sources. In a low-energy regime, in the range between nJ and μJ, hollow core-photonic crystal fibers (HC-PCF) are used for nonlinear spectral broadening and pulse compression. In the high-energy, mJ regime, so far, a method consists in increasing the bandwidth through self-phase modulation (SPM) in a noble gas-filled hollow core fiber (HCF) followed by dispersion compensation, using chirped mirrors with negative group velocity dispersion (GVD) for example.

Another method uses laser sources based on spatiotemporal enhancement, using multi modes states that need to be stabilized. However, multidimensional solitary states sustained by the standard cubic nonlinearity are highly unstable in most cases, and stabilization remains a long-standing challenge. Graded-index (GRIN) solid-core multimode fibers with low modal dispersion are contemplated for stabilization of the multidimensional states fiber optics. However, step-index fibers have significant modal dispersion, and multimode states in the output beam from these fibers are prone to spatial walk-off and strong instability.

In summary, known methods each involves a number of limitations and drawbacks. Optical parametric amplification (OPA) methods are fundamentally limited by the transparency window of the nonlinear crystal, phase-matching condition, and precise temporal synchronization which set strict boundaries to the operating range. Furthermore, optical parametric amplification (OPA) methods often require multiple stages, are bulky, expensive, complex, impair beam quality, and deliver pulse durations comparable to the one of the pumping laser system. For example, typical tunable infrared, below 3000 nm, optical parametric amplification (OPA) is costly and its energy conversion efficiency from the pump to the frequency-down-converted is nearly 20% (signal or idler). For longer wavelength, above 3000 nm, non-oxide nonlinear crystals are used; however, nonoxide crystals exhibit smaller bandgap and inferior thermomechanical properties as well as high concentration of defects and residual multiphoton absorption resulting in dropping the efficiency to −1%. In hollow core fibers (HCF) pulse compression, the broadening efficiency of self-phase modulation (SPM) is inversely proportional to the input pulse duration, making it less applicable for pulses with longer duration. Therefore, cascaded hollow core fibers (HCF) are used to compress long pulses to a few-cycle pulse duration; for example, although high power Yb fiber, disk and slab systems are very attractive in terms of power scaling, robustness, and cost-efficiency, their pulse duration is about few hundreds of femtoseconds to picosecond. Thus, the compression of such laser systems requires multi-meter long HCF or at least two HCF compression stages. For two HCF compression stages, the coupling of the compressed pulses into the second HCF is challenging as discussed hereinabove. Besides, there is a limitation for the maximum energy per pulse for conventional HCF setups. To scale the energy, larger core fibers with longer lengths are used to provide enough nonlinearity, which adds to the complexity of the system. To date, HCF pulse compression is still limited to 1 TeraWatt peak power for the input pulses.

When applying spatiotemporal effects in solid core fiber, current stable sources based on the solid core multimode fibers restrict the maximum peak power due to their low optical damage threshold, and they typically work at nJ level of energy per pulse. Also, their nonlinearity and dispersion are fixed by the core. Furthermore, the transparency window is limited. The nonlinear interactions in gas filled HCF have been mainly in the effective 1-dimensional (1D) regime, because the coupling to higher-order modes (HOM) of high energy pluses has been considered detrimental due to the strong instability. Efficient multidimensional interactions and the creation of stable multimode states with high spatiotemporal coherence in large core HCFs are yet to be achieved.

There is still a need in the art for ultrafast laser sources and methods of fabrication thereof.

SUMMARY OF THE INVENTION

More specifically, in accordance with the present invention, there is provided an ultrafast laser source comprising a waveguide module and a compression module, wherein the waveguide module generates pulses of multidimensional solitary states from ultrashort-laser pulses and the compression module compresses the pulses of multidimensional solitary states at the output of the waveguide module.

There is provided a method for fabrication of an ultrafast laser source, comprising generating pulses of multidimensional solitary states from ultrashort laser pulses; and compressing the pulses of multidimensional solitary states.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1D is a schematic view of compression according to an embodiment of an aspect of the present disclosure;

DESCRIPTION OF ILLUSTRATIVE EMBODIMENTS

The present invention is illustrated in further detail by the following non-limiting examples.

FIG. 1 illustrate spatiotemporal nonlinear enhancement according to an embodiment of an aspect of the present disclosure with a high-energy spatiotemporal laser source system using multidimensional interaction in a gas filled-hollow core fiber for spatiotemporal nonlinear enhancement.

Figure 1A:
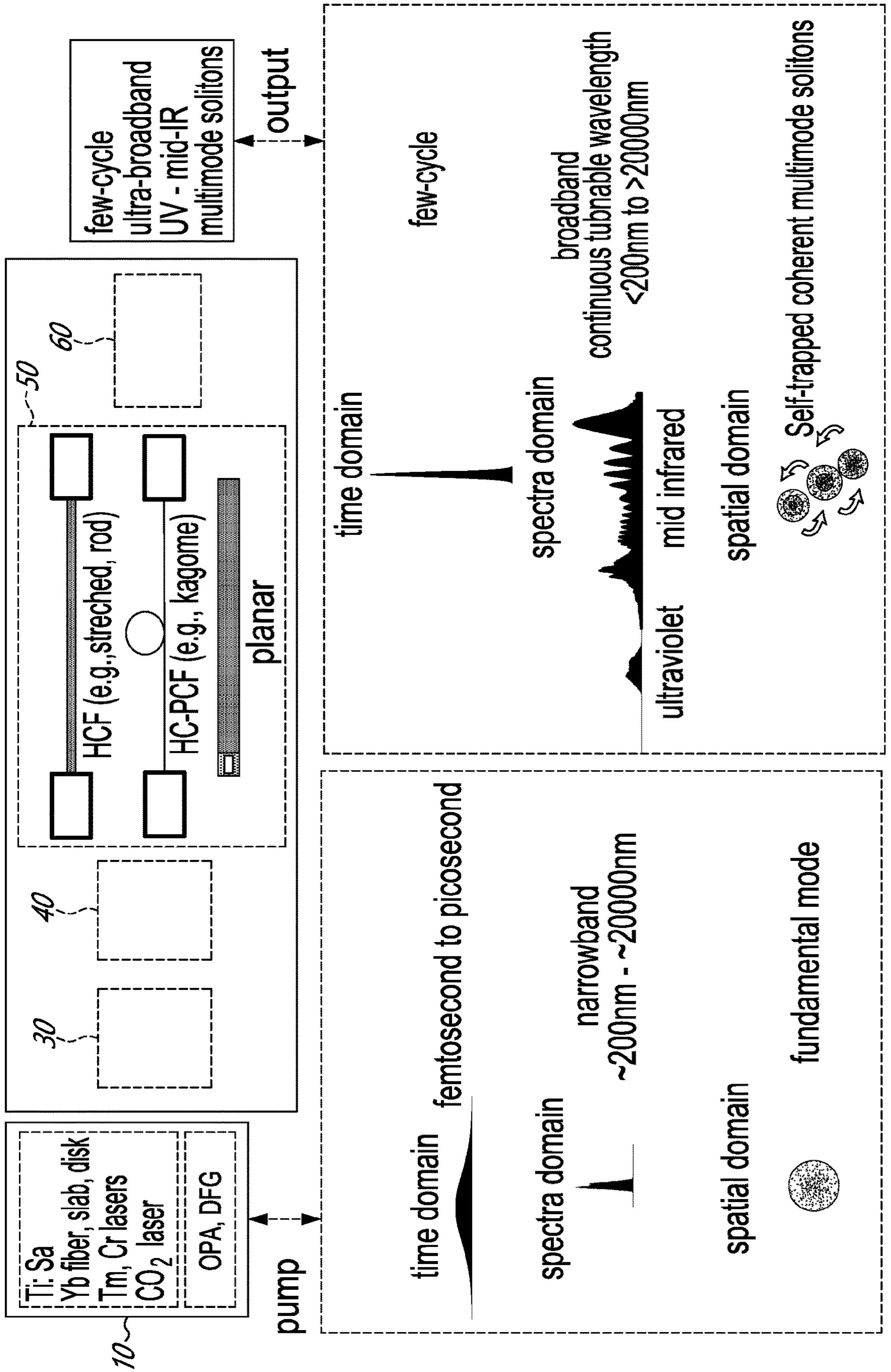
FIG. 1A is a schematic view of a system according to an embodiment of an aspect of the present disclosure.

As illustrated in FIG. 1A, the system comprises a spatial a waveguide module 50 and a compression module 60.

The ultra-short pulse laser source 10 to be compressed typically emits pulses with pulse duration below 100 picoseconds and pulse energy above 1 microjoule.

The waveguide module 50 comprises a hollow core waveguide selected with a hollow core diameter at least the wavelength of the ultra-short pulse laser source 10 to be compressed. The waveguide module 50 allows multidimensional interactions independently of specific waveguides. A range of hollow core waveguides may be used, such as rod HCFs, stretched HCFs, hollow core photonics crystal fibers (HC-PCF) and planar hollow waveguides, for example.

At the output of the waveguide module 50, the compression module 60 compresses the negatively chirped broadband output pulses of multidimensional solitary states (MDSS) of quadratic spectral phase to the Fourier transform-limited pulse duration. In the case of ultrafast laser sources 10 such as Ti:Sa and Yb lasers for example, a window of solid material such as fused silica or calcium fluoride for example may be used to directly compress the output pulses to few-cycle duration for example (FIG. 1D). Alternatively, the pulses may be compressed by propagation through a gas, such as dry air, dry nitrogen, or through a noble gas such as helium, for example, to avoid absorption in the mid-IR, regardless of their wavelength since gas provide positive chirp.

Figure 1B:
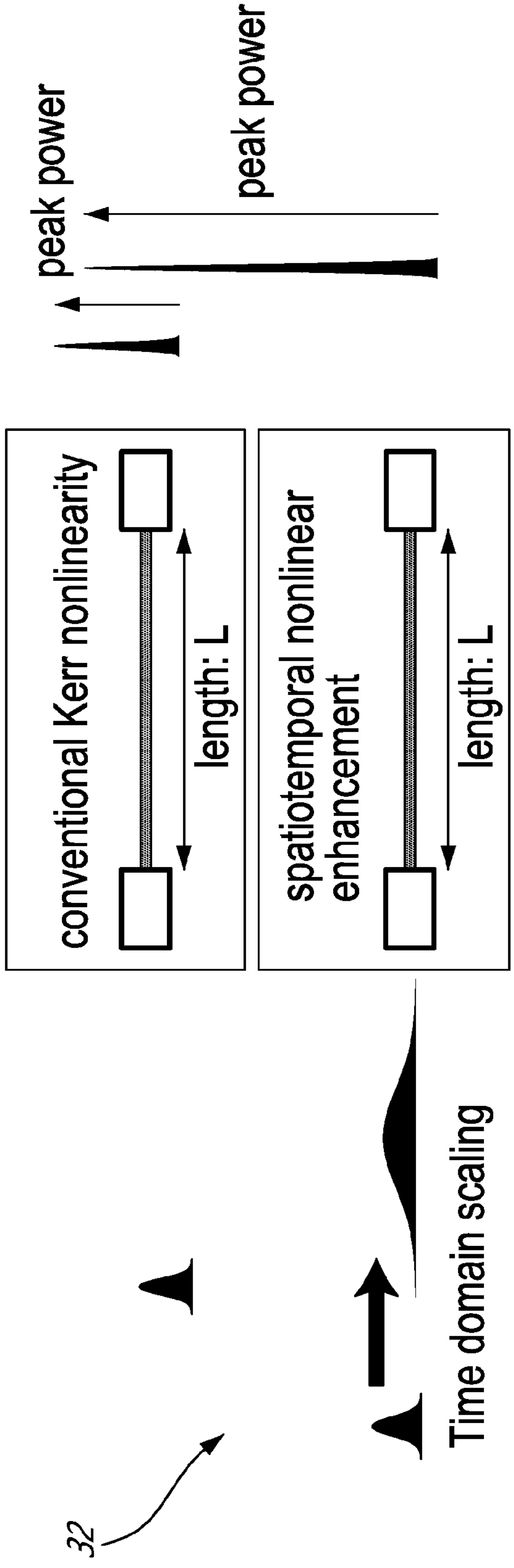
FIG. 1B is a schematic view of power scaling according to an embodiment of an aspect of the present disclosure.
Figure 1C:
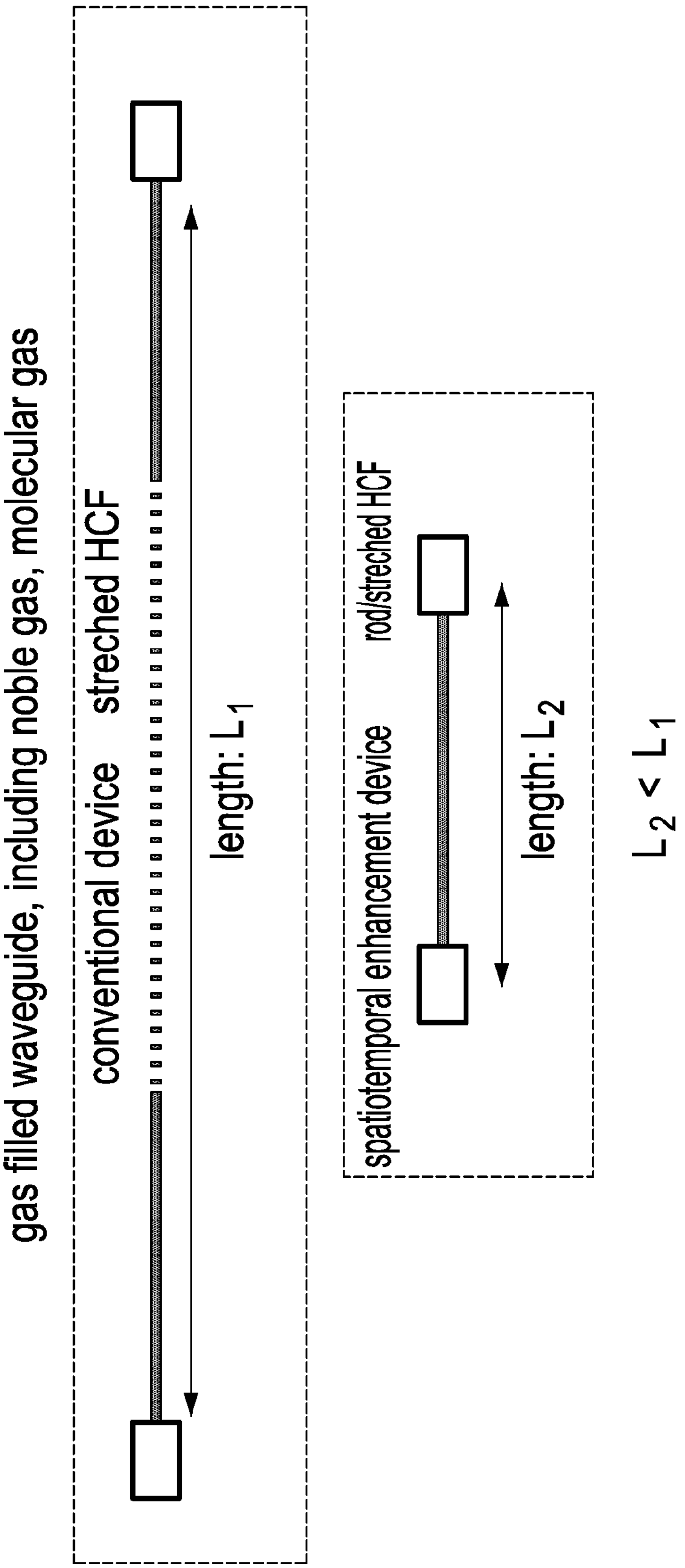
FIG. 1C is a schematic view of a detail of the system of FIG. 1A according to an embodiment of an aspect of the present disclosure.
Figure 14:
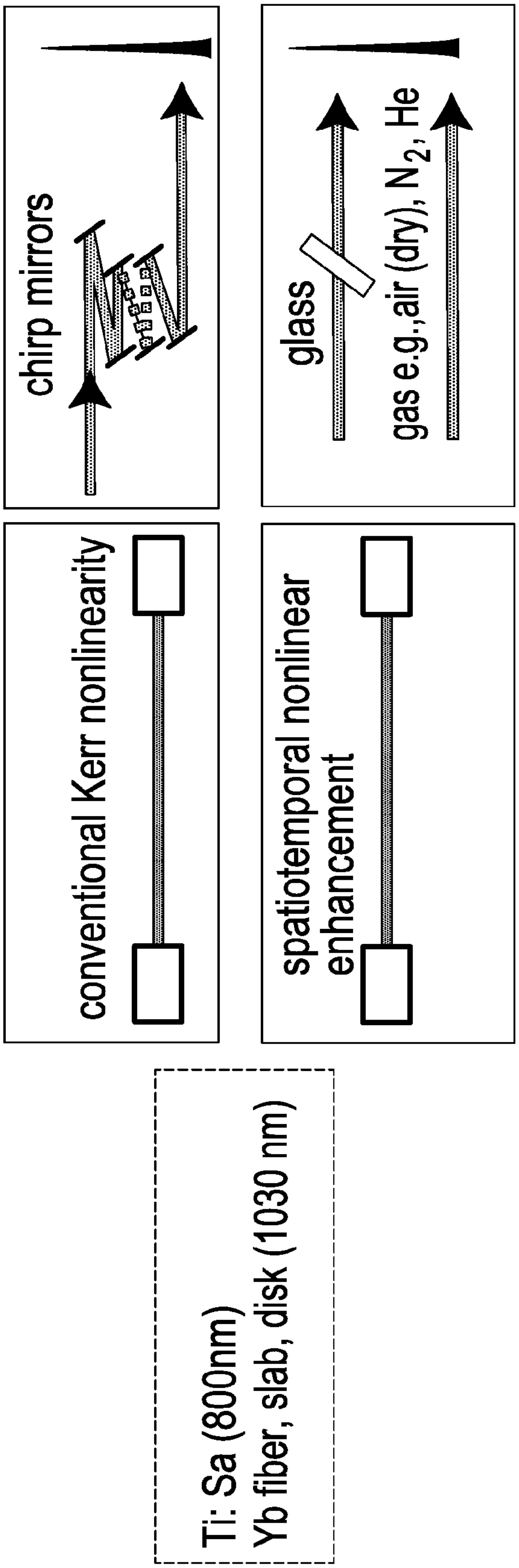

A power scaling module 30 is used to pre-chirp the input laser pulses thereby increasing the energy per pulse and reducing their input peak power. The power scaling module thus controls the input chirp of the pulses emitted by the laser source 10, using gratings, prisms, pulse shapers such as Dazzlers, deformable mirrors, wave shapers or chirped mirrors for example, without countering fundamental limitations such as gas ionization and beam collapse. The energy per pulse is thus increased at the output of the waveguide module by spatiotemporal nonlinear enhancement, leading to higher peak power, as shown in FIG. 1B by a longer arrow in the right handside compared to conventional Kerr nonlinear enhancement (shown with smaller arrow).

The hollow core waveguide is positioned using a multi-axis stage for movement and tilt relative to the incident beam to adjust to the initial spatial condition in a spatial coupling module 40. A focusing element such as a lens, a spatial light modulator, or deformable mirrors may be used for wavefront shaping to control spatiotemporal nonlinear interactions at the input coupling fiber and spectral information as feedback. The spatial coupling module 40 thus controls nonlinearity to balance diffraction and dispersion and achieves beam confinement at laser powers matching critical power for self-focusing. Thus, the spatial coupling module 40 controls spatial coupling to target spatiotemporal nonlinear enhancement and beam confinement.

Spatiotemporal nonlinear enhancement is achieved using shorter interaction length of fiber $L_2$ than in conventional devices ($L_2<L_1$ in FIG. 1C); for example, a rod HCF of a length of about 1 meter may be used as compared to typically between about 3 and 6 meters of stretched HCF for compression of Yb laser with a duration of few hundreds of fs, which increases compactness of the system. The compression module 60 achieves multidimensional solitary states (MDSS) compression, which may be used in any spectral region, as a low-cost route for few-cycle pulse generation. In comparison, conventional spectral broadening devices using self-phase modulation (SPM) and multiple chirped-mirror sets with negative chirp to post-compress pulses (FIG. 1D) are complex and costly; besides, chirped mirrors are typically designed and manufactured only for a specific wavelength range.

The resulting system is compact and robust. The system delivers high-energy few-cycle pulses in a broad range of spectral regions, from below 200 nm to above 20000 nm, for example between about 200 nm and about 20000 nm, and maybe pumped with different lasers of pulse duration below 100 picoseconds with pulse energy above 1 microjoule, for example in the range between about 1 microjoule and about 1 Joule, accordingly. It may be pumped with different laser drivers at a number of wavelength such as titanium sapphire (Ti:Sa), ytterbium (Yb), fiber, slab, or disk, thulium, chromium, holmium and carbon dioxide ($CO_2$) lasers or parametric devices such as optical parametric amplification (OPA), optical parametric chirped pulse amplification (OPCPA), and difference-frequency generation (DFG) (see FIG. 1A). Spatiotemporal effects are controlled by the spatial coupling module. The system may selectively enhance the nonlinearity by selecting combinations of hollow-core waveguides and gas medium for multidimensional nonlinear interactions. The beam at the output of the hollow-core waveguide may be controlled to have pure negative chirp for efficient direct compression to few-cycle pulse duration.

Figure 2:
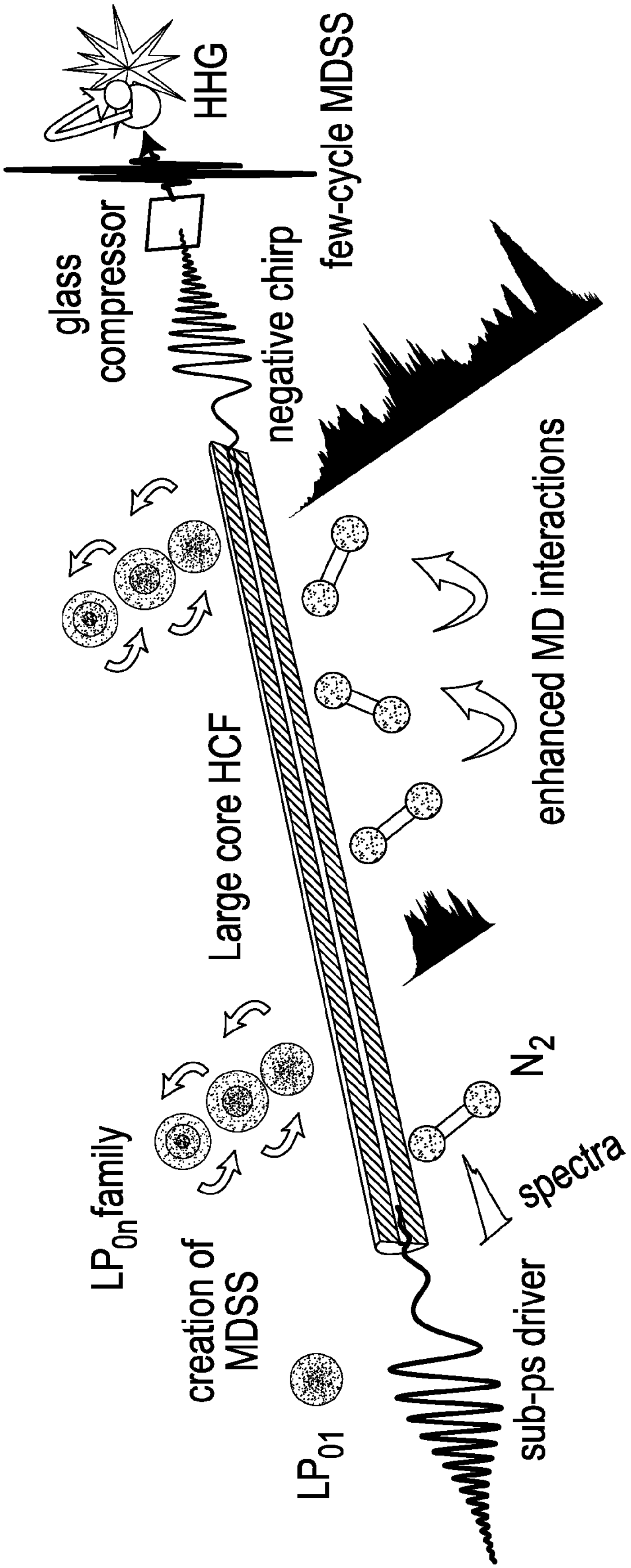
FIG. 2 shows the evolution of self-trapped solitary states with enhanced nonlinear spatiotemporal interactions in nitrogen-filled HCF.

FIG. 2 schematically illustrates optimizing the focal spot size at the input of a large core HCF for obtaining high coupling efficiency into the fundamental mode. Under the weak guiding condition in the HCF, modes fall into groups of linearly polarized modes ($LP_{mn}$). Self-focusing in the HCF corresponds to a transfer of energy from the fundamental mode ($LP_{01}$) to higher $LP_{mn}$ modes, which have rotational symmetry with maximum intensity in the central part. In the high-intensity regime, typically in the range between about $10^{11}$ and about $10^{13}$ W/cm$^2$, the effects of self-focusing and diffraction become significant and multiple $LP_{On}$ modes are created upstream of the fiber. These extended multidimensional pathways lead to Raman enhancement, and a resulting nonlinearity balances the potential diffraction. This nonlinear self-trapping mechanism, together with the ultra-low modal dispersion inherent to large core HCFs, causes the generated multimode beam to undergo efficient red-shifted spectral broadening through cascaded stimulated Raman scattering (SRS).

In an experiment, 700 fs high-energy pulses 5 mJ/pulse with a central wavelength of 780 nm were launched into a 3 m long, 500 μm hollow-core fiber filled with nitrogen. The 700 fs pulses were obtained by positively chirping 40 fs pulses from a Titanium-Sapphire amplifier. At the HCF output, coherent solitary states located at the leading edge of the initial driver pulse with a negative quadratic spectral phase were separated from the pump part by using a long-pass filter (above 830 nm). The pump part was selected using a band-pass filter (760 nm-790 nm). The broadband output pulses (above 830 nm) were subsequently compressed using a window of fused silica (FS).

Evolution of self-trapped solitary states with enhanced nonlinear spatiotemporal interactions in the nitrogen-filled HCF is shown in FIG. 2, schematically illustrating generation and propagation of the multimode beam (above the fiber), these multimodes composed of $LP_{On}$ modes being created upstream of the fiber as schematically shown on the left handside. These states are self-trapped in the $LP_{On}$ modes family with periodic energy exchange while propagating through the HCF. The evolution of the spectra is schematically depicted (below the fiber), starting with the input spectra on the left handside, to the broadened red-shifted spectra on the right handside. The broadband red-shifted spectra originate from enhanced cascaded stimulated Raman scattering due to multidimensional interactions over the interaction length L of the large core HCF. The output broadband pulses schematically shown on the far right handside have a negative chirp and are compressed by linear propagation in a window of fused silica, with normal dispersion below 1.3 microns. High-order harmonic generation (HHG) is used to confirm the spatiotemporal quality and peak power of the red-shifted output pulses.

Figure 3A:
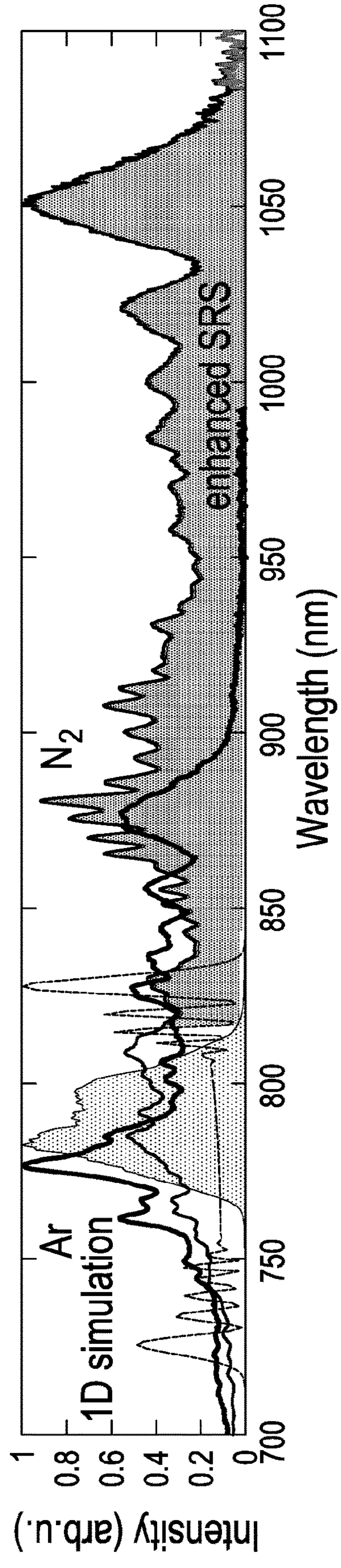
FIG. 3A shows measured spectra for 700 fs input pulses after an $N_2$-filled HCF (3 bar) with enhanced red-shifted spectra through stimulated Raman scattering (SRS): the output spectra when the HCF is filled with Ar (dark curve extending up to 900 nm), 1D simulation (dashed curve extending from 725 nm to 825 nm); the input spectra (lighter full curve), and the experimental spectra (dark curve extending up to 1100 nm)
Figure 3B:
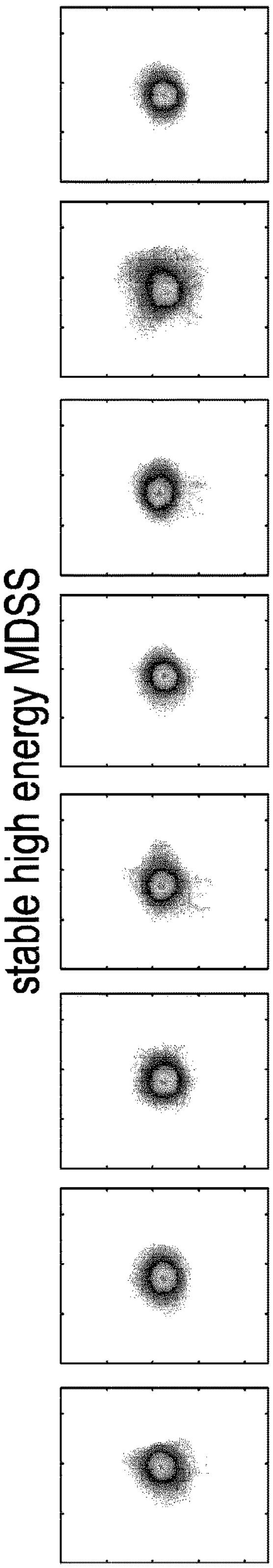
FIG. 3B shows multidimensional solitary states (MDSS) spatial profiles obtained using an 830 nm long-pass filter after the fiber, for 8 single-shot consecutive pulses.
Figure 3C:
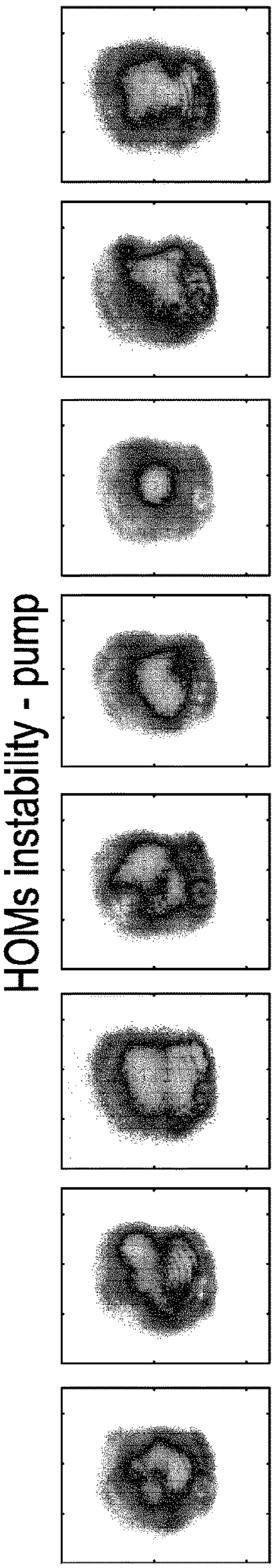
FIG. 3C shows the spatial profile of the laser beam at the output of the HCF after a band-pass filter; 760-790 nm.

FIG. 3A shows measured spectra for 700 fs input pulses after an $N_2$-filled HCF (3 bar) with enhanced red-shifted spectra through stimulated Raman scattering (SRS), 1D simulation (dashed curve extending from 725 nm to 825 nm); the input spectra (lighter full curve), the output spectra when the HCF is filled with Ar (dark curve extending up to 900 nm), experimental spectra (dark curve extending up to 1100 nm). A self-trapped, highly stable, and clean beam is obtained. The red-shifted spectra in Raman active gas such as $N_2$, $N_2O$, or $CO_2$ for example have stable spatial properties at peak powers comparable to the critical power for self-focusing. The stability of the self-trapped output beam is demonstrated in the multidimensional solitary states (MDSS) spatial profiles obtained using a 830 nm long-pass filter after the fiber, with 8 consecutive single-shot far-field images shown in FIG. 3B. FIG. 3C indicates strong spatial instability and coupling to higher-order modes (HOMs) near the input pump wavelength.

Figure 4A:
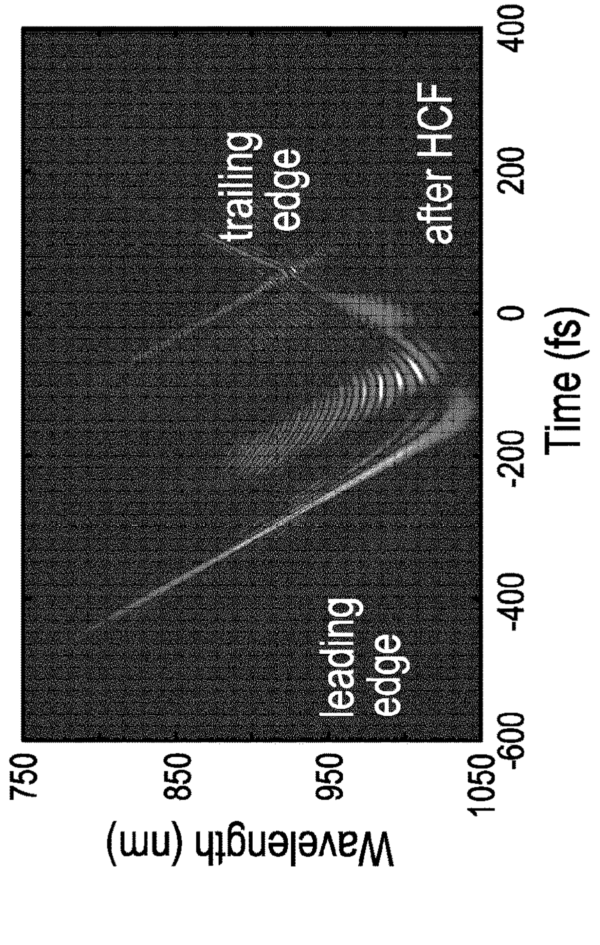
FIG. 4A shows the Wigner function of the retrieved second-harmonic generation-frequency-resolved optical gating (SHG-FROG) trace, directly measured at the output of the HCF.
Figure 4B:
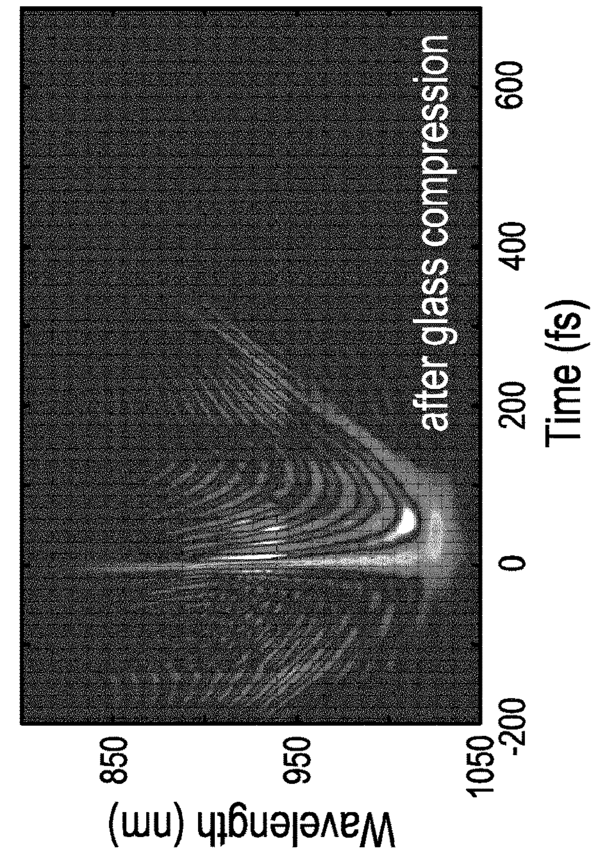
FIG. 4B shows the Wigner function of the retrieved second-harmonic generation-frequency-resolved optical gating (SHG-FROG) trace, directly measured after pulse compression with glass.
Figure 4C:
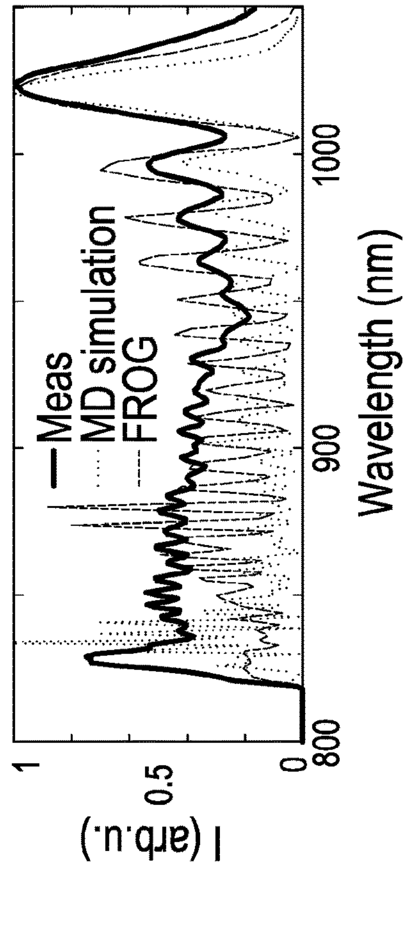
FIG. 4C shows the measured spectra (full line), the spectra predicted from a multidimensional simulation (dot line), and the retrieved spectra from the second-harmonic generation-frequency-resolved optical gating (SHG-FROG) measurements of the compressed pulses (stipple line)
Figure 4D:
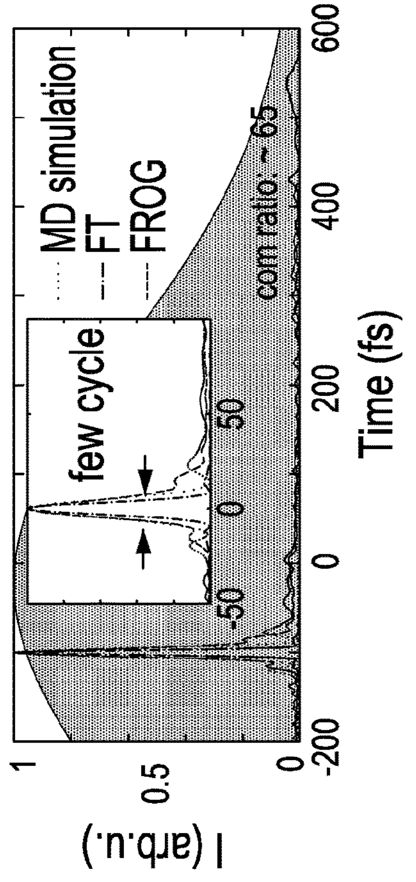
FIG. 4D shows the temporal profile of the sub-picosecond pulses before the hollow core fiber (in shade); the measured temporal profile of the compressed pulses after the HCF using second-harmonic generation-frequency-resolved optical gating (SHG-FROG) demonstrating 10.8 fs pulse duration (stipple line), the Fourier transform (FT) of the output spectra (dash-dot line), and the predicted pulse temporal profile from a multidimensional simulation (MD) (dot line).

The Wigner function was used for time-frequency analysis of the output beam to investigate temporal properties. FIG. 4 show the temporal evolution of the self-trapped output beam driven by 5 mJ 700 fs pulses at 2500 mbar. FIG. 4A shows the Wigner function of the output pulses from the reconstructed second-harmonic generation-frequency-resolved optical gating (SHG-FROG) trace, where the dominant negative quadratic spectral phase at the leading edge of the pulse contains the majority of the energy, indicating the localization of the output beam at the leading edge of the driver pulse with negative chirp. Consequently, the beam was post-compressed down to 10.8 fs by propagating through a window of fused silica (FS) glass, with positive group velocity dispersion (GVD) below 1.3 microns (FIG. 4B). The corresponding spectra are presented FIG. 4C. FIG. 4D shows the temporal characterization of the compressed pulses. The ratio between the pump pulse duration and the compressed red-shifted pulse duration, of a value of −65, is much higher than the corresponding ratio achieved with pulse compression based on Kerr nonlinearities under the same HCF geometry. This demonstrates a compression ratio, defined as the value of the input pulse duration divided by the output pulse duration, of 65.

Thus, based on spatiotemporal Raman enhancement, a highly stable multimode beam is generated by inducing a phase-mismatch for intermodal four wave mixing using hollow core fiber (HCF) of a core diameter of at least the wavelength of the laser source, for example in a range between 50 microns and 10 mm, for example between 50 microns and 1 mm as presently commercially available.

In FIG. 3A, the measured spectra for the 700 fs input driver after the $N_2$-filled HCF (3 bar) was obtained with different input pulse energies in a range between about 1 millijoule and about 15 millijoules by varying the pressure of $N_2$ between about 5 bars and 500 mbars, showing versatility and adaptability of the system. For lower pulse energy, down to about 100 microjoules, similar spectra and pulse compression ratio were obtained with $N_2O$ using a 1 m long 250 microns core diameter rod HCF. The expected spectrum from a 1D simulation, and the experimental spectra for argon was determined at the same pressure. Although HCF is intrinsically considered as step-index fibers, the modal dispersion and losses scale inversely with the second and third power of the core size, respectively, and hollow core fibers (HCFs) provide ultra-low modal dispersion and small losses. In experiments, 700 fs, high-energy pulses (5 mJ/pulse) with a central wavelength of 780 nm were used as a pump, and the pump was focused on a spot size of −330 μm and coupled into a 3-meter-long HCF with 500 μm core diameter stretched between two holders. A translation stage was used at the fiber entrance for alignment at both ends and for optimizing the mode quality at output. Optimization of the coupling conditions was achieved by feedback adjustment of input coupling conditions while monitoring the output spectrum. The HCF was filled by nitrogen ($N_2$) at the pressure of 2500 mbar.

There is thus provided a multimodal tunable laser source using spatiotemporal nonlinear enhancement via strong nonlinear mode-coupling and a platform such as molecular gas-filled HC-PCF, hollow core fiber (HCF), and planar hollow waveguides, operating for a wide wavelength range extending from below 200 nm to higher than 20000 nm, for example between about 200 nm and about 20000 nm, and high energy regime, in the range between about 1 microjoule and about 1 Joule depending on the diameter of the HCF and on the laser wavelength. For example, high-energy $CO_2$ laser may be compressed using a large core HCF or planar waveguide. Besides, nonlinearity and dispersion may be tuned by varying the pressure and gas mixture. A wide window of transparency extending from the vacuum ultraviolet to the mid-infrared spectra range is obtained.

There is provided a method for controlling efficient, tunable, and power scalable multidimensional interactions with the ability to create stable high-energy multidimensional states.

There is provided a system operated for pulse energy of at least 1 microjoule, in a range of energy between about 1 microjoule and about 1 Joule of pulse energy for example, depending on the diameter of the waveguide and the laser wavelength, by selecting the waveguide geometry, generating a highly stable and localized output beam.

There is provided a compact, tunable, and power scalable ultrafast laser source based on spatiotemporal nonlinear enhancement. The present system and laser source provide broadband red-shifted spectra with the capability to continuously tune the central wavelength, independently of the driver wavelength, as alternatives to OPA for intense ultra-broadband long-wavelength infrared/mid-infrared driver sources. Furthermore, the s present system and laser source generate few-cycle pulses with a high degree of temporal coherency in a single HCF, as opposed to cascaded hollow core fibers (HCF) arrangement or multiple meters long hollow core fibers (HCF) as typically needed in the current state of art for high energy pulse compression. The present system and laser source may be pumped directly using commercial Yb, Tm, and Ho lasers with picosecond (ps) pulse durations for example. The system may efficiently operate in ps regime, and is scalable to power beyond the fundamental limitations of the current systems by pre-chirping the input pulses.

The present method. system and laser source allow a high degree of controllability based on spatiotemporal nonlinear effects, continuous tunability of the central wavelength of the output beam, high spatial quality, and confinement for output beam; clean negative chirp for output pulses resulting in efficient and direct post-compression to few-cycle pulse duration.

The scope of the claims should not be limited by the embodiments outlined in the examples but should be given the broadest interpretation consistent with the description.

The invention claimed is:

1. An ultrafast laser source, comprising:

a waveguide module selected as a hollow core waveguide of a core diameter of at least a wavelength of ultrashort laser pulses; and a compression module;

wherein said waveguide module generates pulses of multidimensional solitary states from ultrashort-laser pulses and said compression module compresses the pulses of multidimensional solitary states at the output of the waveguide module.

2. The ultrafast laser source of claim 1, wherein said core diameter of the hollow waveguide is comprised in a range between 50 microns and 1 mm.

3. The ultrafast laser source of claim 1, wherein one of: rod hollow core fibers, stretched hollow core fibers, hollow core photonics crystal fibers and planar hollow waveguides.

4. The ultrafast laser source of claim 1, wherein said compression module comprises one of: a gas and a glass.

5. The ultrafast laser source of claim 1, comprising a power scaling module, said power scaling module controlling the chirp of the ultrashort laser pulses.

6. The ultrafast laser source of claim 1, comprising a power scaling module, said power scaling module controlling the chirp of the ultrashort laser pulses using at least one of: gratings, prisms, pulse shapers, deformable mirrors, wave shapers and chirped mirrors.

7. The ultrafast laser source of claim 1, comprising a spatial coupling module, said spatial coupling module controlling spatial coupling of ultrashort laser pulses to said waveguide module.

8. The ultrafast laser source of claim 1, comprising a spatial coupling module, said spatial coupling module controlling spatial coupling of the ultrashort laser pulses to said waveguide module using one of: focusing elements, spatial light modulators and deformable mirrors.

9. The ultrafast laser source of claim 1, wherein the ultrashort laser pulses have a pulse duration of at most 100 picoseconds and a pulse energy of at least 1 microjoule.

10. A method for generating high intensity ultrafast pulses, comprising generating pulses of multidimensional solitary states from ultrashort laser pulses in a hollow core waveguide of a core diameter of at least a wavelength of the ultrashort laser pulses; and compressing the pulses of multidimensional solitary states.

11. The method of claim 10, wherein the core diameter of the hollow waveguide is comprised in a range between 50 microns and 10 mm.

12. The method of claim 10, wherein the core diameter of the hollow is comprised in a range between 50 microns and 1 mm.

13. The method of claim 10, the waveguide being one of: rod hollow core fibers, stretched hollow core fibers, hollow core photonics crystal fibers and planar hollow waveguides.

14. The method of claim 10, comprising compressing the pulses of multidimensional solitary states using one of: a gas and a glass.

15. The method of claim 10, comprising controlling the chirp of the ultrashort laser pulses.

16. The method of claim 10, comprising controlling the chirp of ultrashort laser pulses using at least one of: gratings, prisms, pulse shapers, deformable mirrors, wave shapers and chirped mirrors.

17. The method of claim 10, comprising controlling spatial coupling of the ultrashort lasers to the hollow core waveguide.

18. The method of claim 10, wherein the ultrashort laser pulses have a pulse duration of at most 100 picoseconds and a pulse energy of at least 1 microjoule.

* * * * *